United States Patent [19]

Deutsch

[11] Patent Number: 4,889,226
[45] Date of Patent: Dec. 26, 1989

[54] APPARATUS FOR TRANSFERRING BLOCK-SHARD GROUPS OF ROD-SHAPED ARTICLES OF THE TOBACCO PROCESSING INDUSTRY

[75] Inventor: Reinhard Deutsch, Geesthacht, Fed. Rep. of Germany

[73] Assignee: Körber AG, Hamburg, Fed. Rep. of Germany

[21] Appl. No.: 216,322

[22] Filed: Jul. 7, 1988

[30] Foreign Application Priority Data

Jul. 11, 1987 [DE] Fed. Rep. of Germany ....... 3723001

[51] Int. Cl.[4] .............................................. B65G 47/68
[52] U.S. Cl. .................................. 198/450; 198/481.1; 198/482.1; 53/148
[58] Field of Search ...................... 198/449, 450, 474.1, 198/476.1, 478.1, 480.1, 481.1, 482.1, 441; 53/148, 149, 151, 234

[56] References Cited

U.S. PATENT DOCUMENTS

| | | | |
|---|---|---|---|
| 3,479,787 | 11/1969 | Bardenhagen et al. ................ | 53/148 |
| 3,777,453 | 12/1973 | Zimmermann et al. ............. | 198/450 |
| 4,164,997 | 8/1979 | Mueller ................................ | 198/441 |
| 4,367,618 | 1/1983 | Focke ................................... | 53/148 |

FOREIGN PATENT DOCUMENTS 1330300 9/1973 United Kingdom ................ 198/449

Primary Examiner—Joseph E. Valenza
Attorney, Agent, or Firm—Peter K. Kontler

[57] ABSTRACT

An apparatus for transferring arrays of cigarettes from the pockets of at least one intermittently driven first conveyor into the pockets of a continuously driven second conveyor wherein the transfer takes place by means of at least one pair of arms which have pockets for arrays of cigarettes and are indexible about a common axis to define for their pockets a path a first portion of which overlaps a portion of the path for the pockets of the first conveyor and a second portion of which registers with a portion of the path which is defined for its pockets by the second conveyor. The pockets of the arms receive arrays from the pockets of the first conveyor while the arms are at a standstill, and the pockets of the arms are in positions for transfer of their contents into the pockets of the second conveyor while the arms move at the speed of the second conveyor. The path portion wherein the pockets of the second conveyor receive arrays from the pockets of the arms is arcuate and its center of curvature is located on the common axis of the arms. The pockets of the arms extend radially of the common axis.

17 Claims, 3 Drawing Sheets

APPARATUS FOR TRANSFERRING BLOCK-SHARD GROUPS OF ROD-SHAPED ARTICLES OF THE TOBACCO PROCESSING INDUSTRY

BACKGROUND OF THE INVENTION

The invention relates to apparatus for manipulating groups or arrays of rod-shaped articles of the tobacco processing industry, and more particularly to improvements in apparatus for transferring arrays of cigarettes or like articles from at least one intermittently driven article-supplying conveyor to at least one article-receiving conveyor. Still more particularly, the invention relates to improvements in apparatus for manipulating groups or arrays of cigarettes or other rod-shaped articles of the tobacco processing industry which are about to be converted into packs or like products.

German Offenlegungsschrift No. 19 09 777 discloses an oscillatory carrier of arrays of rod-shaped articles which accepts arrays from an intermittently driven supplying conveyor and delivers the arrays to a continuously advancing receiving conveyor. The arrangement is such that the supplying conveyor is idle when the carrier receives an array therefrom, and the carrier thereupon accelerates the array to the speed of the continuously advancing receiving conveyor not later than during transfer of the array onto the receiving conveyor.

A drawback of the just described apparatus is that its capacity is limited, i.e., that the frequency at which the arrays are delivered to the receiving conveyor cannot be increased beyond a relatively low upper limit. Furthermore, the articles which form the arrays are not treated gently, especially if the frequency of delivery of arrays to the receiving conveyor is close to or reaches the aforementioned upper limit.

OBJECTS AND SUMMARY OF THE INVENTION

An object of the invention is to provide novel and improved means for transferring arrays of rod-shaped articles of the tobacco processing industry from intermittently driven article-supplying conveyor means to continuously driven article-receiving conveyor means.

Another object of the invention is to provide provide transferring means which can deliver arrays of rod-shaped articles at a frequency exceeding that of heretofore known transferring means.

A further object of the invention is to provide novel and improved article-receiving conveyor means which can accept arrays of rod-shaped articles from the afore-discussed transferring means.

An additional object of the invention is to provide novel and improved article-supplying conveyor means for delivery of arrays of rod-shaped articles to the aforementioned transferring means.

Still another object of the invention is to provide novel and improved means for moving the component parts of the transferring means.

A further object of the invention is to provide a cigarette packing machine which embodies the above outlined conveying and transferring means.

Another object of the invention is to provide a novel and improved combination of the aforediscussed transferring means with article-supplying and article-receiving means.

An additional object of the invention is to provide a novel and improved method of transferring arrays of cigarettes or other rod-shaped articles of the tobacco processing industry from an intermittently driven article-supplying conveyor to a continuously driven article-receiving conveyor.

A further object of the invention is to provide the transferring means with novel and improved receptacles for block-shaped arrays of cigarettes or like articles of the tobacco processing industry.

Another object of the invention is to provide a combination of article-supplying and article-receiving conveyor means with article transferring means wherein the articles are treated gently even when they are being transferred at a frequency exceeding that in heretofore known combinations.

A further object of the invention is to provide a simple, compact and inexpensive but versatile and reliable apparatus for manipulating cigarettes or other rod-shaped articles of the tobacco processing industry between one or more units which accumulate arrays of rod-shaped articles and a packing machine.

The invention is embodied in an apparatus for manipulating arrays of rod-shaped articles of the tobacco processing industry, particularly block-shaped arrays of, for example, twenty parallel rod-shaped articles each. The apparatus comprises intermittently driven article-supplying first conveyor means having a plurality of first receptacles for arrays of rod-shaped articles and defining for the first receptacles a first predetermined path, continuously driven article-receiving second conveyor means having a plurality of second receptacles for arrays of rod-shaped articles and defining for the second receptacles a second predetermined path, and means for transferring arrays of rod-shaped articles from the first receptacles into the second receptacles. The transferring means comprises at least one pair of third receptacles for arrays of rod-shaped articles and means for intermittently indexing the third receptacles about a common axis along a third predetermined path so that successive intervals of standstill or idleness of the third receptacles alternate with successive intervals of angular movement of third receptacles about the common axis at the speed of the second conveyor means. The third path has a first portion which is aligned with a portion of the first path and a second portion which is aligned with a portion of the second path. The third receptacles alternatingly register with discrete first receptacles in the aforementioned portion of the first path (i.e., in the first portion of the third path) during successive intervals of standstill, and with discrete second receptacles in the aforementioned portion of the second path (i.e., in the second portion of the third path) during successive intervals of angular movement.

The third receptacles are or can be disposed substantially radially of the common axis.

The aforementioned portion of the first path is or can be arcuate, and one of the third receptacles is substantially tangential to the arcuate portion of the first path during each interval of standstill of the third receptacles.

The aforementioned portion of the second path is preferably a portion of a circular path.

The indexing means can include an arm for each third receptacle, and each such arm preferably includes a free end portion which is remote from the common axis and is provided with a pocket constituting the respective third receptacle.

The second conveyor means preferably includes an endless chain or belt conveyor having an elongated reach or stretch which defines the aforementioned portion of the second path; such portion of the second path preferably constitutes a portion of a circular path with a center of curvature on or close to the common axis. The first conveyor means preferably also includes at least one endless chain or belt conveyor which defines the aforementioned portion of the first path. As mentioned above, such portion of the first path is or can be arcuate.

In accordance with a presently preferred embodiment of the invention, the improved apparatus comprises two discrete first conveyors each having a plurality of first receptacles, and the transferring means of such apparatus comprises the aforementioned at least one pair of third receptacles for transferring arrays of rod-shaped articles from one of the first conveyors to the second conveyor means, and a second pair of third receptacles for transferring arrays of rod-shaped articles from the first receptacles of the other of the two first conveyors to the second conveyor means. The transferring means of such apparatus further comprises means for indexing the third receptacles of the second pair about a second common axis (which can coincide with the first-mentioned common axis) along a fourth predetermined path. The other first conveyor defines for the respective first receptacles a fifth path, and the fourth path includes a first portion which is aligned with a portion of the fifth path and a second portion which is aligned with a second portion of the second path. Means is provided for driving the first conveyors in synchronism. Each of the two indexing means can comprise two arms, one for each of the respective third receptacles, and the arms of each of the indexing means are preferably rigid (e.g., integral) with each other. The apparatus can further comprise stationary guide means (e.g., stationary tracks for roller followers on the second conveyor means) for that portion or for those portions of the second conveyor means which define the aforementioned portion or portions of the second path.

The apparatus can further comprise, or cooperate with, means for introducing arrays of rod-shaped articles into first receptacles in a second portion of the first path and (if the first conveyor means comprises two endless conveyors) in a second portion of the fifth path.

Each first receptacle has outlet means for arrays of rod-shaped articles, and each second receptacle has inlet means for arrays of rod-shaped articles. Each third receptacle can be provided with an inlet and an outlet for arrays of rod-shaped articles; the inlets of the third receptacles can extend in parallelism with the common axis and the outlets of the third receptacles then extend radially of the common axis, or vice versa.

If the apparatus comprises a single indexing means, such indexing means can comprise arms for the two third receptacles and a shaft for each arm. One of the shafts is preferably hollow and the other shaft is preferably received in the hollow shaft.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
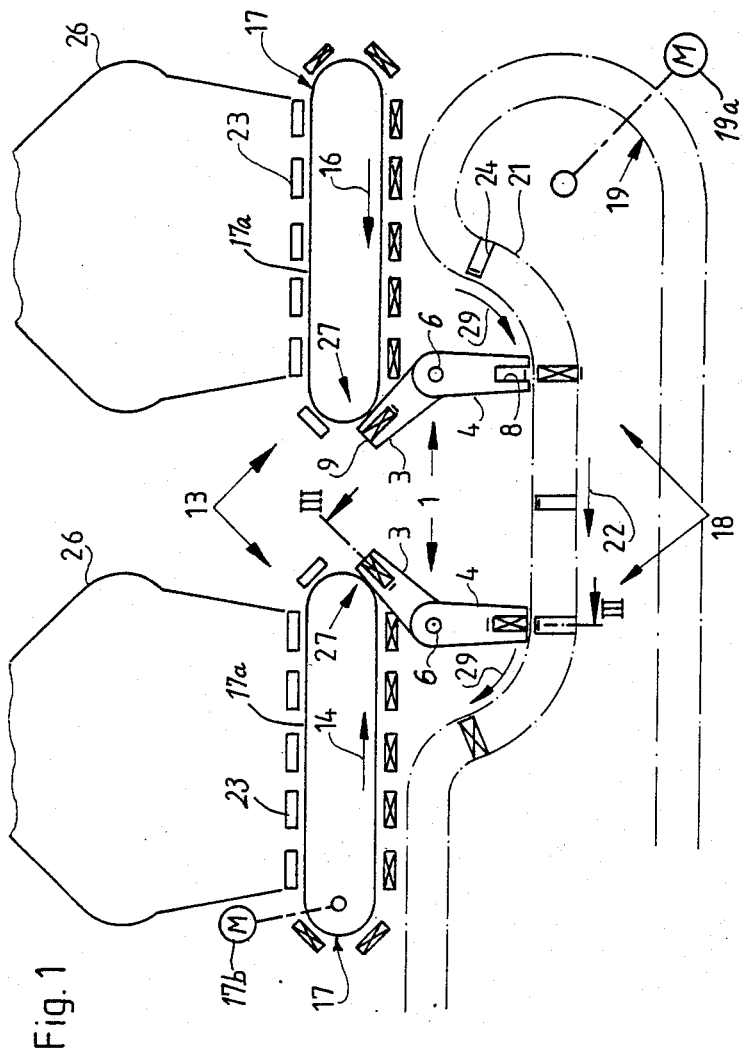
FIG. 1 is a schematic side elevational view of an apparatus which embodies one form of the invention and which is designed to deliver arrays or groups of cigarettes or other rod-shaped articles of the tobacco processing industry from several magazines to a packing machine.

The apparatus which is shown in FIG. 1 comprises two endless first conveyors 17 each of which can constitute a belt or chain conveyor and each of which has a set of equidistant receptacles in the form of substantially horizontal pockets 23. The conveyors 17 transport their respective pockets 23 along two endless paths each of which has a horizontal upper reach 17a beneath a set of equidistant ducts (not specifically shown) provided in a discrete magazine 26 serving to store a supply of parallel rod-shaped articles (e.g., plain cigarettes or filter cigarettes) of the tobacco processing industry. The arrangement is such that the pockets 23 of the upper reaches 17a of the endless conveyors 17 receive successive layers of parallel rod-shaped articles (hereinafter called cigarettes for short) during successive intervals of dwell or standstill of the conveyors 17. The means for driving the conveyors 17 in synchronism and in stepwise fashion (so that intervals of standstill or idleness alternate with intervals of movement along the respective endless paths) comprises a variable-speed motor 17b, a geneva motion or another suitable prime mover.

The manner in which the conveyors 17 cooperate with the magazines 26 can be the same as or similar to that disclosed in commonly owned U.S. Pat. Nos. 4,503,967 to Erdmann et al., 4,471,866 to Erdmann et al. and 4,362,235 to Erdmann. The disclosures of these patents are incorporated herein by reference. The pockets 23 of the right-hand conveyor 17 are advanced in the direction of arrow 16, and the pockets 23 of the left-hand conveyor 17 are advanced in the direction of arrow 14. Each pocket 23 which has been advanced beyond the respective magazine 26 contains a complete array 9 of cigarettes which together form a substantially block-shaped body ready to be draped into one or more blanks of paper, cardboard and/or metallic foil, e.g., in a manner as disclosed in commonly owned copending patent application Ser. No. 207,294 filed June 15, 1988 for "Method of and apparatus for packing rod-shaped articles of the tobacco processing industry". Each array can contain three superimposed layers of cigarettes including two outer layers of seven cigarettes each and an intermediate layer of six cigarettes. Such cigarettes are preferably disposed in the customary quincunx formation. However, other arrays or groups can be assembled in the pockets 23 without departing from the spirit of the invention; for example, each array can comprise two layers of ten cigarettes each or three layers of seven cigarettes each.

Figure 3:
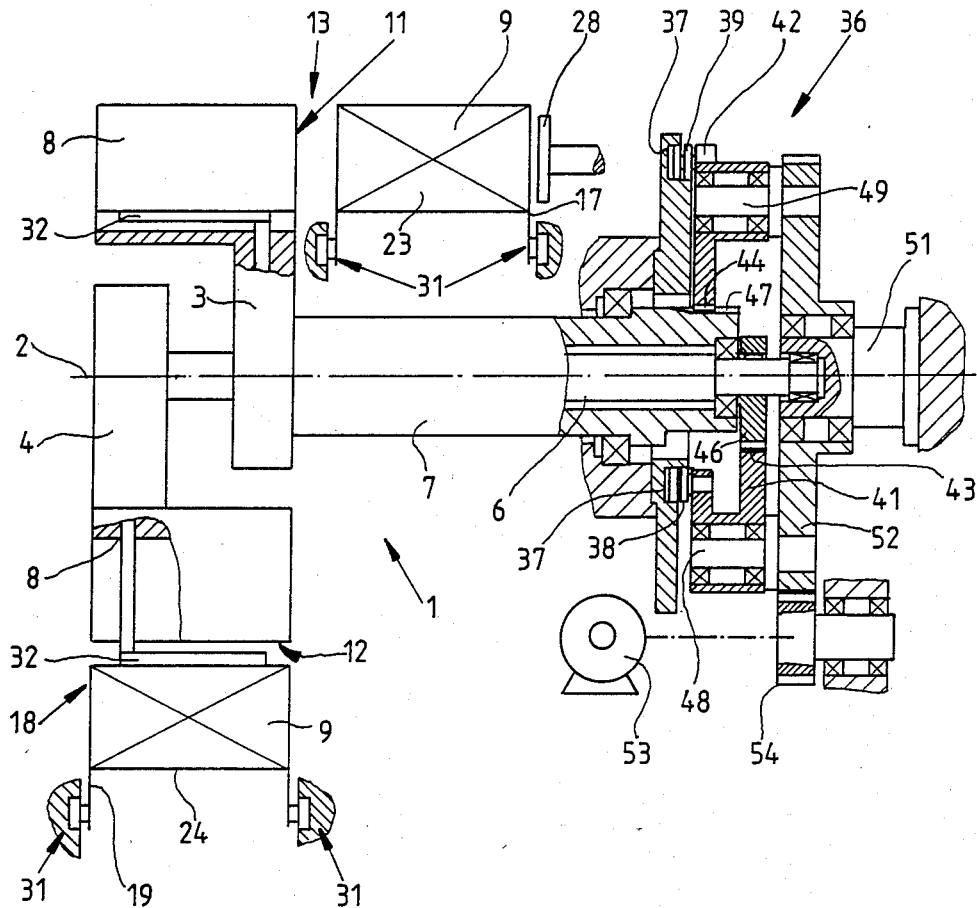
FIG. 3 is a greatly enlarged fragmentary sectional view as seen in the direction of arrows from the line III-III in FIG. 1.

The apparatus further comprises an endless second conveyor 19 which carries a set of equidistant receptacles in the form of horizontally extending pockets 24. Each pocket 24 can indirectly receive an array 9 of cigarettes from one of the conveyors 17 through the intermediary of transferring means including two pairs of arms 3, 4, one pair for each of the conveyors 17. The upper reach 21 of the conveyor 19 advances in the direction of arrow 22 at a speed which matches the speed of intermittent movement of arms 3 and 4 in directions indicated by arrows 29. The arms 3, 4 form part of means for indexing pairs of receptacles in the form of pockets 8 which are provided in the free end portions of the respective arms, and each pocket 8 extends substantially radially of the common axis 2 of the respective arms. As can be seen in FIG. 3, each of the two indexing means further comprises a hollow shaft 7 which carries the respective arm 3 and a second shaft 6 which is rotatable in and preferably movable axially of the hollow shaft 7 and is rigid with the respective arm 4. FIG. 3 further shows that each pocket 8 has an inlet 11 which extends in parallelism with the respective common axis 2, and an outlet 12 which extends radially of the axis 2. The inlets 11 of the pockets 8 can receive arrays 9 from the outlets of the pockets 23, and the outlets 12 can deliver arrays 9 to the inlets of the pockets 24. The shafts 6, 7 of each of the two indexing means can receive motion from a suitable geneva movement which is not shown in the drawing. Geneva movements are often employed in cigarette packing and like machines. Reference may be had, for example, to commonly owned U.S. Pat. No. 3,750,676 to Kruse et al.

The means for continuously driving the conveyor 19 at a selected speed includes a motor 19a. The shafts 6, 7 drive the respective pockets along endless circular paths each of which includes a first portion (at 13) adjacent an arcuate portion of the endless path for the respective set of pockets 23, and a second portion (at 18) adjacent a partly circular portion of the endless path defined by the conveyor 19. The two partly circular portions of the endless path which is defined by the conveyor 19 have centers of curvature on the respective axes 2. Cigarettes which are being assembled into arrays 9, as well as the cigarettes of the arrays 9, normally move sideways, i.e., in parallelism with the axes of the arms 3, 4.

The apparatus of FIGS. 1 and 3 operates as follows:

When the arms 3 or 4 are at a standstill, each of these arms maintains its then empty pocket 8 in alignment with a filled pocket 23 of the respective conveyor 17, and two pushers 28 (one shown in FIG. 3) are actuated by a system of cams or the like to expel the arrays 9 from the pockets 23, through the inlets 11 of the adjacent empty pockets 8 and into such pockets 8. All this takes place while the arms 3 or 4 are idle, together with the conveyors 17. The conveyor 19 is in motion and moves an empty pocket 24 toward one of the path portions 18 while simultaneously moving a filled pocket 24 away from the other path portion 18. FIG. 1 shows that stage of operation when the pockets 8 of the arms 3 are in the process of receiving arrays 9 from the registering pockets 23 of the respective conveyors 17, when the pocket 8 of the right-hand arm 4 has already delivered an array 9 to a pocket 24 of the conveyor 19 (during travel of such pocket 24 along the right-hand arcuate path portion 18) and when the pocket 8 of the left-hand arm 4 is about to deliver its contents (i.e., an array 9) into the registering empty pocket 24.

When the transfer of arrays 9 into the pockets 8 of the arms 3 is completed, the arms 3 and 4 can be set in motion, either jointly or independently of one another, so that they trade positions. A preferred means for moving the arms is shown in FIG. 3. During such angular movement of the right-hand arms 3, 4 of FIG. 1, the arm 3 is accelerated to the speed of the conveyor 19 not later than when its filled pocket 8 moves to a position of register with an empty pocket 24 which is about to enter the right-hand path portion 18. A pusher 32 (see FIG. 3) which is associated with the pocket 8 expels the array 9 by way of the outlet 12 and into the adjacent pocket 24 while the pockets 8 and 24 move at the same speed along the right-hand path portion 18 so that the transfer of the array 9 from the pocket of the arm 3 into the adjacent pocket 24 is completed when the right-hand arm 3 reaches the position shown in FIG. 1 as being occupied by the right-hand arm 4. The left-hand arm 4 carries an array 9 while it dwells in the position of FIG. 1 but is relieved of such array during the initial stage of its movement toward the position shown as being occupied by the left-hand arm 3. At the same time, the pocket 8 of the left-hand arm 3 carries an array 9 toward the six o'clock position of the circular path which is defined by the left-hand arms 3 and 4. The regions of transfer of arrays 9 from the pockets 23 into the pockets 8 are indicated at 27, and the character 1 denotes the entire transferring means including the two pairs of arms 3, 4 and the corresponding shafts 6 and 7 as well as the pushers 28 and 32. The pushers 28 transfer arrays 9 at right angles to the plane of FIG. 1, and the pushers 32 transfer arrays 9 radially of and away from the axes 2 of the respective indexing means. The cigarettes which form the arrays 9 move axially only during transfer from the pockets 23 of the conveyors 17 into the pockets 8 of the arms 3 or 4 in the respective transfer regions 27.

The apparatus preferably comprises tracks 31 (FIG. 1) which guide the upper reach 21 of the conveyor 19 in the arcuate (partly circular) portions 18 of the path which is defined by the receiving conveyor 19, and similar tracks 31 can be provided for the portions of conveyors 17 in the regions 27. Each such track can include a set of roller followers which extend into grooves provided therefor in the adjacent fixed frame member of the improved apparatus.

The intervals of angular movement of the arms 3 or 4 with the adjacent portions of the upper reach 21 of the conveyor 19 are sufficiently long to ensure that the pushers 32 can complete the transfer of arrays from the pockets 8 into the adjacent pockets 24 without defacing and/or otherwise affecting the appearance and/or other characteristics of the arrays. The same applies for the transfer of arrays 9 from the pockets 23 into the pockets 8 during the intervals of standstill of the arms 3, 4 in the respective regions 27.

An important advantage of the improved apparatus is that the conveyors 17 can operate intermittently (which is desirable for predictable accumulation of cigarettes into arrays 9 during stepwise advancement of pockets 23 along the outlets at the lower ends of ducts in the respective magazines 26), whereas the conveyor 19 can be driven without interruptions in order to permit rapid conversion of arrays 9 into portions of cigarette packs, e.g., in the apparatus of the aforementioned commonly owned copending patent application Serial No.

The number of arms in each half of the illustrated transferring means 1 can be increased without departing from the spirit of the invention. Furthermore, the apparatus of FIGS. 1 and 3 can be simplified by omitting one of the conveyors 17, one of the magazines 26, and one-half of the transferring means 1.

The arms 3, 4 of each of the two indexing means are rotatable about a common axis but must be free to turn relative to each other because, if the arms move in unison during the first stage of each of their angular movements, one of the arms must be free to continue to move while the other arm is already at a standstill. For example, and referring to the right-hand arm 4 of FIG. 1, this arm must complete a distance of approximately 135° in order to move from the illustrated position to that shown as being occupied by the arm 3. On the other hand, the arm 3 must cover a distance of approximately 225° in order to move from the illustrated position to that shown as being occupied by the right-hand arm 4. During the next-following cycle, the arm 3 moves through 135° in order to reassume the position of FIG. 1, and the arm 4 must move through an angle of 225° in order to reassume the position which is shown in FIG. 1.

FIG. 3 further shows a presently preferred mechanism for moving the arms 3 and 4 jointly as well as relative to each other. The illustrated mechanism comprises a stop-and-go gear transmission 36 which can rapidly accelerate the arms 3, 4 from standstill to full-speed angular movement and vice versa as well as move the arm 3 independently of the arm 4 and the other way around.

The transmission 36 comprises a fixed disc cam 37 having an endless cam track for roller followers 38 and 39 which are respectively provided on levers 41 and 42. The lever 41 has an internal gear 43 in mesh with a gear segment 46 of the shaft 6, and the lever 42 has an internal gear 44 in mesh with a gear segment 47 of the shaft 7. The gear segments 46, 47 are rigidly connected to or integral with the respective shafts 6 and 7. The levers 41 and 42 are rotatable on bearings 48 and 49 which are provided on a gear 52 rotatablly mounted on a stationary shaft 51. The gear 52 meshes with a pinion 54 which can be driven by an electric motor 53.

The transmission 36 can move the arms 3, 4 relative to each other, i.e., the arms can be arrested one after the other, they can be accelerated, continuously pivoted, decelerated and arrested in an optimum sequence and for optimum intervals of time such as are necessary to ensure that the pockets 8 of the arms can accept arrays 9 from the respective stepwise operated conveyor 17 and can deliver the arrays 9 to the continuously driven conveyor 19 in the aforedescribed manner. The pinion 54 on the output element of the motor 53 drives the gear 52 which, in turn, orbits the levers 41, 42. The followers 38, 39 of the levers 41, 42 track the cam 37 whose groove has a configuration which is necessary to ensure that the gears 43, 44 turn the arms 3, 4 by way of the respective gear segments 46, 47 and through angles and at intervals which are necessary for predictable conveyor 19.

Figure 2:
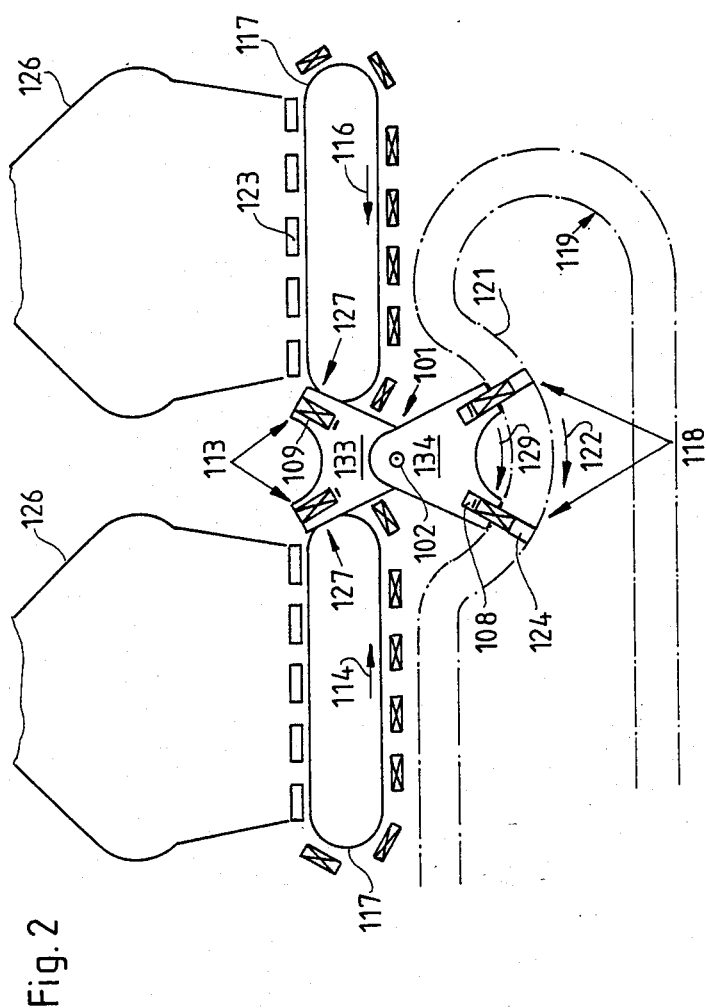
FIG. 2 is a similar schematic side elevational view of a modified apparatus.

FIG. 2 shows a portion of a modified apparatus wherein all such parts which are identical with or clearly analogous to corresponding parts of the apparatus of FIGS. 1 and 3 are denoted by similar reference characters plus 100. The main difference is that the upper reach 121 of the receiving conveyor 119 has a semicircular portion wherein two immediately following receptacles or pockets 124 can simultaneously receive arrays from the adjacent pockets of an arm 133 or 134. Each of the arms 133, 134 has two receptacles or pockets 108. The apparatus of FIG. 2 is even more compact and simpler than the apparatus of FIG. 1. The arms 133, 134 are indexible about a common horizontal axis 102 but they do turn relative to each other so that the pockets 108 of the arm 133 can receive arrays from the pockets 123 of the endless first conveyors 117 while the arm 134 moves to maintain its pockets 108 in register with a pair of pockets 124 for transfer of arrays 109 onto the receiving conveyor 119 and vice versa.

An advantage of the improved apparatus is that it can supply arrays 9 or 109 at a frequency which exceeds the frequency of treansfer of arrays in conventional apparatus. Moreover, the gathering of cigarettes or other rod-shaped articles of the tobacco processing industry into arrays can proceed at a high speed.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for manipulating unconfined arrays of rod-shaped articles of the tobacco processing industry, comprising intermittently driven article-supplying first conveyor means having a plurality of first receptacles for arrays of rod-shaped articles and defining for said receptacles a first predetermined path, each of said first receptacles having outlet means for arrays of rod-shaped articles; continuously driven article-receiving second conveyor means including an endless conveyor having a plurality of second receptacles for arrays of rod-shaped articles and including a reach defining for the second receptacles a second predetermined path, each of said second receptacles having inlet means for arrays of rod-shaped articles; and means for transferring arrays of rod-shaped articles from the first receptacles into the second receptacles, including at least one pair of third receptacles for arrays of rod-shaped articles and means for intermittently indexing said third receptacles in a single direction about a common axis along a third predetermined path so that successive intervals of standstill of said third receptacles alternate with successive intervals of angular movement of said third receptacles about said axis at the speed of said second conveyor means, each of said third receptacles having inlet means and outlet means for arrays of rod-shaped articles, one of the inlet and outlet means of each third receptacle being disposed in parallelism with said common axis and the other of the inlet and outlet means of each third receptacle being disposed radially of said common axis, said third path having a first portion aligned with a portion of said first path and a second portion aligned with a portion of said second path, said portion of said second path constituting a portion of a circular path having a center of curavature on or close to said common axis, said third receptacles alternatingly registering with discrete first receptacles in said portion of said first path during successive intervals of standstill and with discrete second receptacles in said portion of said second path during successive intervals of angular movement.

2. The apparatus of claim 1, wherein the third receptacles are disposed substantially radially of said axis.

3. The apparatus of claim 1, wherein said portion of said first path is arcuate and one of said third receptacles is substantially tangential to said arcuate portion during each interval of standstill of said third receptacles.

4. The apparatus of claim 1, wherein said indexing means includes an arm for each of said third receptacles.

5. The apparatus of claim 4, wherein said arms have free end portions remote from said axis and said third receptacles are provided in the free end portions of the respective arms.

6. The apparatus of claim 1, wherein said first conveyor means comprises an endless conveyor which defines said portion of said first path.

7. The apparatus of claim 6, wherein said portion of said first path is arcuate.

8. The apparatus of claim 1, wherein said first conveyor means comprises two discrete first conveyors each having a plurality of first receptacles, said transferring means comprising said at least one pair of third receptacles for transferring arrays from the first receptacles of one of said first conveyors to said second conveyor means and a second pair of third receptacles for transferring arrays from the first receptacles of the other of said first conveyors to said second conveyor means.

9. The apparatus of claim 8, wherein said transferring means further comprises means for indexing the third receptacles of said second pair about a second common axis along a fourth predetermined path, said other first conveyor defining for the respective first receptacles a fifth path and said fourth path including a first portion which is aligned with a portion of said fifth path and a second portion which is aligned with a second portion of said second path.

10. The apparatus of claim 9, further comprising means for driving said first conveyors in synchronism.

11. The apparatus of claim 8, further comprising means for indexing the third receptacles of said second pair about a common axis, each of said indexing means comprising arms for the respective third receptacles and the arms of each of said indexing means being rigid with each other.

12. The apparatus of claim 1, wherein said indexing means comprises discrete arms for said third receptacles, said arms being rigid with each other.

13. The apparatus of claim 1, further comprising stationary guide means for that portion of said second conveyor means which defines said portion of said second path.

14. The apparatus of claim 1, wherein at least one of said first and second conveyor means comprises at least one belt or chain conveyor.

15. The apparatus of claim 1, further comprising means for introducing arrays of rod-shaped articles into first receptacles in a second portion of said first path.

16. The apparatus of claim 1, wherein said indexing means comprises arms for said third receptacles and shafts for said arms, one of said shafts being hollow and the other of said shafts being received in said one shaft.

17. Apparatus for manipulating arrays of rod-shaped articles of the tobacco processing industry, comprising intermittently driven article-supplying first conveyor means including two discrete first conveyors each having a plurality of first receptacles for arrays of rod-shaped articles and each defining for the respective first receptacles a first predetermined path; continuously driven article-receiving second conveyor means having a plurality of second receptacles for arrays of rod-shaped articles and defining for the second receptacles a second predetermined path; and means for transferring arrays of rod-shaped articles from the first receptacles into the second receptacles, including a first pair of third receptacles for transferring arrays of rod-shaped articles from the first receptacles of one of said first conveyors to said second conveyor means, a second pair of third receptacles for transferring arrays from the first receptacles of the other of said first conveyors to said second conveyor means, and means for intermittently indexing said third receptacles about a common axis along a third predetermined path so that successive intervals of standstill of said third receptacles alternate with successive intervals of angular movement of said third receptacles about said axis at the speed of said second conveyor means, said third path having two first portions each aligned with a portion of one of said first paths and a second portion aligned with a portion of said second path, said third receptacles of said first pair alternatingly registering with discrete first receptacles in said portion of said one first path during successive periods of standstill and with discrete second receptacles in said portion of said second path during successive intervals of angular movement, said third receptacles of said second pair alternatingly registering with discrete first receptacles in said portion of said other first path during successive periods of standstill and with discrete second receptacles in said portion of said second path during successive intervals of angular movement.

* * * * *